Figure 3:
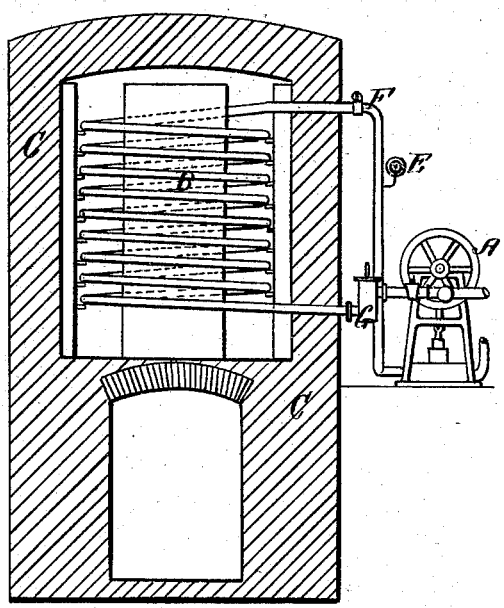

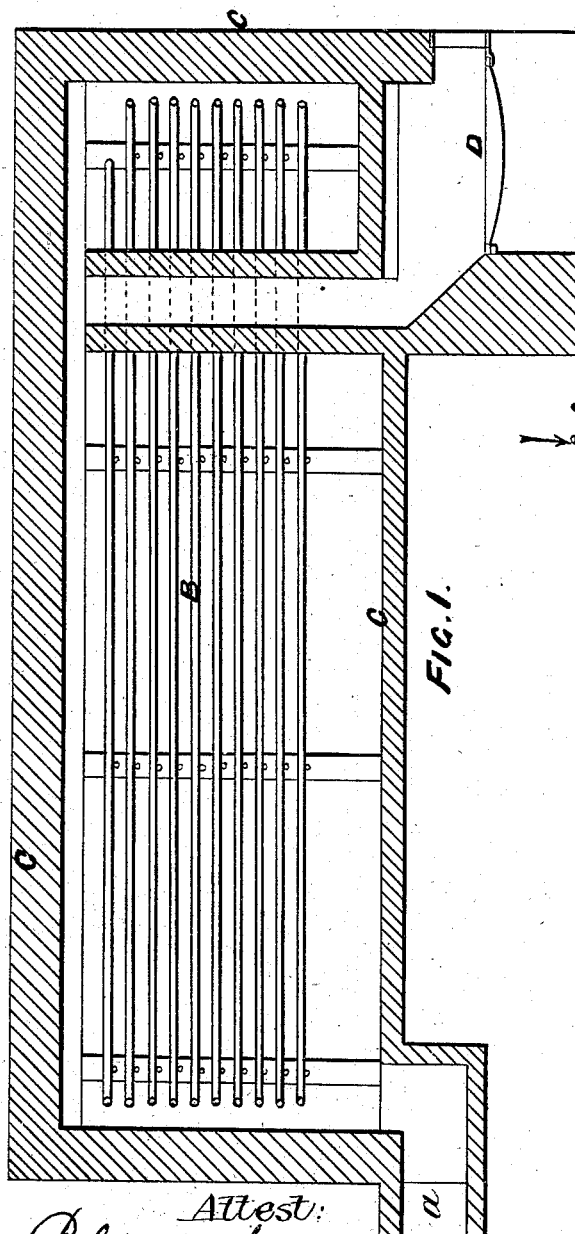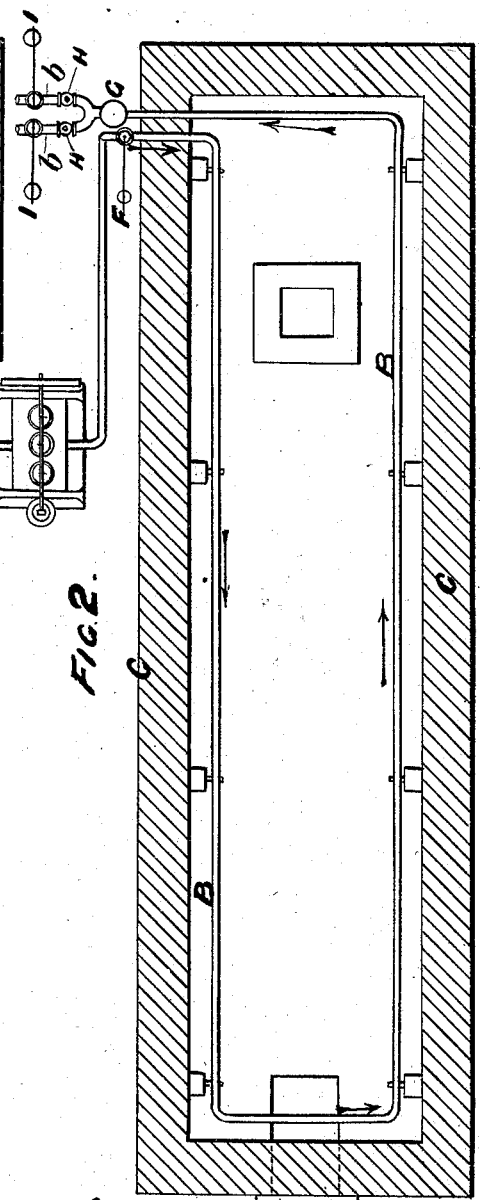

(No Model.) 2 Sheets—Sheet 2.
E. CAREY, H. GASKELL, Jr., & F. HURTER.
PURIFICATION OF ALKALINE SOLUTIONS.

No. 254,919. Patented Mar. 14, 1882.

Witnesses:
Philip Mauro
C. J. Hedrick

Inventors.
Eustace Carey
Holbrook Gaskell Jr
Ferdinand Hurter
by A Pollok
their attorney

UNITED STATES PATENT OFFICE.

EUSTACE CAREY, HOLBROOK GASKELL, JR., AND FERDINAND HURTER, OF WIDNES, COUNTY OF LANCASTER, ENGLAND.

PURIFICATION OF ALKALINE SOLUTIONS.

SPECIFICATION forming part of Letters Patent No. 254,919, dated March 14, 1882.

Application filed December 15, 1881. (No model.) Patented in England July 18, 1879.

*To all whom it may concern:*

Be it known that we, EUSTACE CAREY, HOLBROOK GASKELL, the younger, and FERDINAND HURTER, subjects of the Queen of Great Britain and Ireland, and residing at Widnes, in the county of Lancaster, England, have invented certain Improvements in the Purification of Alkaline Solutions, (for which we have obtained a patent in Great Britain, No. 2,939, dated the 18th day of July, 1879,) of which the following is a specification.

Our said invention relates to the purification of alkaline solutions in order to effect the destruction of the substances known as "ferro-cyanide of sodium" and "ferro-cyanide of potassium," or, in other words, the compound or compounds consisting of sodium or potassium with cyanogen and iron which may be contained in such alkaline solutions.

In carrying out our said invention in order to effect this object, we subject alkaline solutions containing ferro-cyanides to the action of carbonic acid in conjunction with atmospheric air or oxygen; or in conjunction with the treatment with carbonic acid we add to the alkaline solutions sulphur or any compound containing sulphur—such, for example, as hyposulphites or polysulphides—which will, at an elevated temperature, act in the required manner upon the compounds of ferro-cyanogen contained in the alkaline solutions; or any two or more of the before-mentioned decomposing agents may be employed in combination, if found desirable. This treatment preliminary to heating will vary according to the composition of the solution, and in deciding on the kind of treatment the following points should be taken into consideration: First, the ultimate object is the decomposition of the ferro-cyanides by means of a sulphur compound which at an elevated temperature can part with some of its sulphur. Such sulphur compounds are the hyposulphites and the polysulphides. The monosulphides are unsuitable for the purpose. The quantities of such sulphur compounds should be at least five molecules of hyposulphite for every molecule of ferro-cyanide, or $\frac{6}{x-1}$ molecule of polysulphide containing $x$ atoms of sulphur for every one molecule of ferro-cyanide contained in the solution. Thus, if a pentasulphide ($Na_2S_5$) be employed containing five atoms of sulphur, $\frac{6}{5-1} = 1\frac{1}{2}$, one and a half molecules of pentasulphide are therefore necessary for every molecule of ferro-cyanide, ($Na_4FeCy_6$.)

The following equations represent the decompositions which take place in the second or final operation: With hyposulphite, $Na_2S_2O_3$, $5Na_2S_2O_3 + Na_4FeCy_6 = NaCyS + 2Na_2SO_3 + 2Na_2SO_4 + FeO$. With polysulphide, $Na_2Sx$, $6 Na_2Sx + (x-1)Na_4FeCy_6 = 6(x-1)NaCyS + (7-x)Na_2S + (x-1)FeS$, where $x$ may have any value greater than one and not exceeding five. For example: If $x=2$, $6Na_2S_2 + Na_4FeCy_6 = 6NaCyS + 5Na_2S + FeS$. If $x=3$, $6Na_2S_3 + 2Na_4FeCy_6 = 12NaCyS + 4Na_2S + 2FeS$. If $x=4$, $6Na_2S_4 + 3Na_4FeCy_6 = 18NaCyS + 3Na_2S + 3FeS$. If $x=5$, $6Na_2S_5 + 4Na_4FeCy_6 = 24NaCyS + 2Na_2S + 4FeS$; and similarly for any mixture of sulphides.

The solutions which we usually treat are known in the alkali trade as "vat-liquor." The sulphur compound most abundantly present in them is sodium monosulphide. We produce the necessary hyposulphite by oxidation with atmospheric oxygen. The solutions which are afterward to be exposed to an elevated temperature, as hereinafter explained, should not contain any appreciable amount of any substances which will form an insoluble deposit when exposed to an elevated temperature and pressure. Such substances, which are chiefly silica and alumina, must be removed by suitable means. We precipitate them by carbonic acid, and separate them by settling or filtration or other convenient method.

In carrying out our said invention we usually perform the two operations of oxidizing and carbonating simultaneously by blowing or forcing into the alkaline solution gas containing oxygen and carbonic acid, such as may be obtained from the combustion of fuel or from a limekiln or other suitable source. We usually employ the waste gases from a revolving black ash furnace, previously cooling these gases, if necessary. In the case of solutions we have usually to treat we find that fuel-gases containing about ten to thirteen per cent. of carbonic acid and from nine to six per cent. of oxygen are the most suitable; but the proportion of carbonic acid and oxygen required will depend upon the composition of the solution to be treated. The solution thus prepared is next subjected to an elevated temperature, after which the iron which has been precipitated may be separated by settling, filtration, or other convenient method.

In carrying this part of our invention into effect we prefer to employ apparatus so constructed that the process of heating may be carried on continuously, the solution constantly passing through the apparatus. As a convenient method of accomplishing this result we force the solution through a coil or coils or a chamber or passage or passages heated upon the exterior by a furnace or otherwise, and arranged in such a manner that the solution shall be caused to pass continuously along in one or more streams, so as to insure that each and every portion of the solution shall be heated to the required temperature. The temperature required for decomposition of the ferrocyanides varies again with the sulphur compounds used, and is the lower the more atoms of sulphur the compound contains in one molecule. The temperature is highest for the hyposulphite, being about from 350° to 360° Fahrenheit. It is lowest for the pentasulphide, where the decomposition takes place at about from 250° to 270° Fahrenheit. The polysulphides are, however, usually not available, and we prefer to heat the solution to between 350° and 360° Fahrenheit.

In order to prevent boiling of the solution in the apparatus, the solution should be kept under pressure corresponding at least to the tension of steam at that temperature, which is about one hundred and twenty pounds to the square inch; but in order to make absolutely certain that no evaporation may take place should the temperature rise a little above 360° Fahrenheit, we prefer to keep the solution under a very much higher pressure, usually varying from two hundred pounds to three hundred pounds per square inch.

The accompanying drawings represent one example of the varied forms of apparatus which may be employed in carrying out this part of our said invention.

Figure 1 represents a longitudinal vertical section of the apparatus. Fig. 2 is a plan of the same with the top arch removed, and Fig. 3 is an end view with the front wall removed.

The apparatus shown in the drawings consists of a triple ram pump, A, capable of delivering the necessary quantity of liquid against a pressure or head of, say, three hundred pounds to the square inch. This pump sends the liquid into the coil B, which is arranged within a chamber, C, so as to be heated by a furnace, D, the products of combustion from which escape to a chimney at $a$. We prefer to employ one continuous coil of pipes, presenting sufficient heating-surface to allow the liquid to become heated to 350° Fahrenheit in passing once through the entire length of pipes. Between the pump and the entrance to this coil we place a pressure-gage, E, and either an accumulator or, as shown in the drawings, a safety-valve, F, or both, to prevent fracture of apparatus in case of an accidental stoppage in the coil. We prefer the coil to be arranged so that the liquid enters at the highest point and issues at the lowest, and we avoid as far as possible any upward movement of the liquid, all with a view to sweep out solid particles should any enter the tubes along with the liquid. At the outlet end we insert into the pipes a thermometer, at G, to indicate the temperature of the liquid.

The pressure may be conveniently kept up by causing the solution to pass through a valve or valves loaded to the necessary pressure. We find it advisable to fork the exit-pipe, as shown at $b\ b$, and to employ two such valves furnished with the necessary stop-cocks H H, so that one may be repaired while the other is working, I I being escape-boxes for the liquid.

In carrying out this process it is of importance to avoid as far as possible the entrance of solid substances into the coil, and it is as well to filter the solution. Every attention should be paid to the removal of silica and alumina from the solution, as these substances cause an incrustation of the pipes. When working with soda solution care should also be taken not to use the alkaline solutions in too concentrated a condition. The solubility of carbonate of soda in water is less at 350° than at 220° Fahrenheit, and if too concentrated a solution is introduced into the coil monohydrated carbonate of soda will be deposited. Should any deposit in the pipes take place from this cause, it can be removed by passing water through the apparatus. If the temperature is kept at 350° Fahrenheit and sufficient sulphur compounds are present, the whole of the ferrocyanides will be converted into sulpho-cyanides, and the iron they contained will be held in suspension as sulphide or oxide of iron. The solution should be freed from this precipitate by settling, filtration, or other convenient method, and is then ready for evaporation or crystallization and the production of white alkali or crystals.

Having now described and particularly ascertained the nature of our said invention and the manner in which the same is or may be used or carried into effect, we would observe in conclusion that what we consider to be novel and original, and therefore claim as the invention, is—

The system or mode of purifying alkaline solutions by submitting the same to the action of sulphur or sulphur compounds added to or produced in such alkaline solutions, and of carbonic acid, the solutions thus treated being then subjected to an elevated temperature in order that the iron which they contain may be separated therefrom, substantially as hereinbefore described.

In testimony whereof we have signed our names to this specification in the presence of two subscribing witnesses.

EUSTACE CAREY.
HOLBROOK GASKELL, JR.
FERDINAND HURTER.

Witnesses:
E. H. PERRIN,
J. E. PERRIN,
 Both of Exchange St., Liverpool.